(12) United States Patent
Shimomura et al.

(10) Patent No.: US 9,834,690 B2
(45) Date of Patent: Dec. 5, 2017

(54) INK FOR INK-JET PRINTING AND METHOD OF INK-JET PRINTING

(71) Applicant: NIPPON CLOSURES CO., LTD., Tokyo (JP)

(72) Inventors: Hiroshi Shimomura, Osaka (JP); Sei Nakagawa, Kanagawa (JP); Hiroaki Kikuchi, Kanagawa (JP); Katsumi Hashimoto, Kanagawa (JP)

(73) Assignee: NIPPON CLOSURES CO., LTD., Tokyo (JP)

( * ) Notice: Subject to any disclaimer, the term of this patent is extended or adjusted under 35 U.S.C. 154(b) by 20 days.

(21) Appl. No.: 14/888,559

(22) PCT Filed: Apr. 16, 2014

(86) PCT No.: PCT/JP2014/060827
§ 371 (c)(1),
(2) Date: Nov. 2, 2015

(87) PCT Pub. No.: WO2014/181648
PCT Pub. Date: Nov. 13, 2014

(65) Prior Publication Data
US 2016/0083595 A1    Mar. 24, 2016

(30) Foreign Application Priority Data

May 10, 2013 (JP) .................... 2013-100095

(51) Int. Cl.
| | | |
|---|---|---|
| *B41J 2/21* | (2006.01) | |
| *C09D 11/102* | (2014.01) | |
| *B41M 5/00* | (2006.01) | |
| *B41M 7/00* | (2006.01) | |
| *C09D 11/322* | (2014.01) | |
| *C09D 11/36* | (2014.01) | |

(52) U.S. Cl.
CPC ........... *C09D 11/102* (2013.01); *B41J 2/2107* (2013.01); *B41M 5/0064* (2013.01); *B41M 5/0088* (2013.01); *B41M 7/009* (2013.01); *C09D 11/322* (2013.01); *C09D 11/36* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
See application file for complete search history.

(56) References Cited

U.S. PATENT DOCUMENTS

| | | | | |
|---|---|---|---|---|
| 4,501,829 | A * | 2/1985 | Oda | ..................... C09D 167/04 523/400 |
| 5,883,170 | A * | 3/1999 | Tanaka | .................. C09D 167/00 428/458 |
| 2003/0179269 | A1* | 9/2003 | Yamanouchi | ........ B41M 5/5218 347/101 |
| 2004/0191418 | A1* | 9/2004 | Suwama | ............ C08G 18/4283 427/372.2 |
| 2005/0084788 | A1* | 4/2005 | Yau | ......................... G03C 1/74 430/138 |
| 2010/0101842 | A1* | 4/2010 | Akiba | .................... C09D 11/10 427/98.4 |

FOREIGN PATENT DOCUMENTS

| | | |
|---|---|---|
| JP | 2001-279149 | 10/2001 |
| JP | 2003-11342 | 1/2003 |
| JP | 2005-335765 | 12/2005 |
| JP | 2008-208340 | 9/2008 |
| WO | 02/100652 | 12/2002 |

OTHER PUBLICATIONS

International Search Report issued in PCT Application No. PCT/JP2014/060827, dated Jul. 15, 2014.
Extended European Search Report issued in Patent Application No. 14794459.9, dated Oct. 19, 2016.

* cited by examiner

*Primary Examiner* — Manish S Shah
(74) *Attorney, Agent, or Firm* — Greenblum & Bernstein, P.L.C.

(57) ABSTRACT

A solvent type curable ink for ink-jet printing obtained by dissolving or dispersing, in a volatile organic solvent, polyesterpolyol having a molecular weight of not more than 8000, a hydroxyl value (KOH mg/g) of 17 to 50 and a glass transition point (Tg) of not higher than 70° C., and blocked polyisocyanate. The ink is capable of forming ink-jet-printed image on the surfaces of various kinds of formed articles without burring and maintaining close adhesion upon being heated at a low temperature for a short period of time.

7 Claims, No Drawings

INK FOR INK-JET PRINTING AND METHOD OF INK-JET PRINTING

TECHNICAL FIELD

This invention relates to a heat-curing solvent type ink for ink-jet printing and to a method of ink-jet printing using the ink. More specifically, the invention relates to an ink for ink-jet printing adapted to printing plastic formed articles and to a method of printing.

BACKGROUND ART

As means for printing the surfaces of various formed articles, such as plastic caps, containers, plastic films and various other plastic formed articles on an industrial scale, there have been widely used gravure printing and flexography. In recent years, there has also been used a printing means based on an ink-jet system.

Printing means based on the ink-jet system consists of flying tiny ink droplets from a nozzle head so as to be deposited and fixed onto a predetermined recording medium to thereby print an image based on the printing data that are input. This printing means has no need of making a plate, enables the designs to be easily changed, and is suited for printing, specifically, a variety of kinds of products of small lots providing, further, an advantage of inexpensive running costs.

In view of the above advantage, a patent document 1, for example, proposes an art of printing images on the top panel of plastic caps relying on the ink-jet system.

The inks for ink-jet printing that have been known can be grouped into those of the ultraviolet ray-curing type and those of the heat-curing solvent type accompanied, however, by their own advantages and disadvantages.

For instance, the ultraviolet ray-curing ink is polymerized and cured upon the irradiation with an ultraviolet ray and, therefore, has such an advantage that it needs no heating and can be cured in short periods of time. However, the ultraviolet ray-curing ink has such defects that it is very expensive and, besides, forms low-molecular components stemming from a starting agent and the like agents as the polymerization/curing takes place, and generates offensive odor.

On the other hand, the heat-curing solvent type ink is inexpensive and is free from generating offensive odor, but requires the step of curing for being polymerized and cured. Further, if it is attempted to cure the ink in short periods of time, the ink must be heated at a temperature very higher than a melting point of the plastic material. Therefore, the plastic formed articles are subject to be thermally deformed if it is attempted to print images on them using the heat-curing solvent type ink.

It has, therefore, been desired to provide a heat-curing solvent type ink for ink-jet printing that polymerizes and cures upon being heated at a low temperature for a short period of time and that, further, closely adheres onto the formed articles.

For instance, a patent document 2 discloses in its Example 9 an art of forming a polyurethane resin layer on the upper surface of a top panel (outer surface of a top plate) of a plastic cap by using a coating solution that contains polyesterpolyol and polyisocyanate. To form the polyurethane resin layer that firmly adheres onto the cap, however, the coating solution must be heated at a temperature close to 130° C. for several minutes often causing a problem of deformation in the cap. In this case, deformation in the cap can be reliably avoided by shortening the time of heating permitting, however, the coating solution to be blurred. Therefore, the coating solution cannot be used as the ink.

PRIOR ART DOCUMENTS

Patent Documents

Patent document 1: JP-A-2003-11342
Patent document 2: JP-A-2005-335765

OUTLINE OF THE INVENTION

Problems that the Invention is to Solve

It is, therefore, an object of the present invention to provide a heat-curing solvent type ink for ink-jet printing that is capable of ink-jet-printing images on the surfaces of various kinds of formed articles without burring and maintaining close adhesion upon being heated at a low temperature for a short period of time, and a method of printing using the above ink.

Means for Solving the Problems

According to the present invention, there is provided an ink for ink-jet printing including a liquid obtained by dissolving or dispersing polyesterpolyol and blocked polyisocyanate in a volatile organic solvent, said polyesterpolyol having a number average molecular weight of not more than 8000, a hydroxyl value (KOH mg/g) in a range of 17 to 50 and a glass transition point (Tg) of not higher than 70° C.

In the ink for ink-jet printing of the invention, it is desired that:
(1) The blocked polyisocyanate has not less than 3 functional groups;
(2) The blocked polyisocyanate includes at least one kind of a constituent unit selected from the group consisting of diphenylmethane diisocyanate (MDI), tolylene diisocyanate (TDI), hexamethylene diisocyanate (HDI), metaxylene diisocyanate, tetramethylene diisocyanate, pentamethylene diisocyanate, lizine isocyanate and isophorone diisocyanate (IPDI);
(3) The blocked polyisocyanate has its terminals blocked with an active methylene compound;
(4) Diethylene glycol diethyl ether is used as the volatile solvent; and
(5) A pigment is contained.

According to the present invention, further, there is provided a method of ink-jet-printing image on a surface of plastic or nonmetallic formed article, including:
using the above ink for ink-jet printing;
forming a printed layer on the surface of the formed article by ink-jet-printing the ink thereon; and
heating the surface of the formed article at a temperature of 70 to 130° C. to solidify the printed layer.

In the method of printing, it is, specifically, desired that:
(1) The formed article is made from a plastic material;
(2) At least the surface of the formed article is formed by using polyolefin; and
(3) The formed article is a polyolefin cap, and the ink-jet printing is effected onto an outer surface of the top panel of the cap.

Effects of the Invention

The ink for ink-jet printing of the invention has a distinguished feature in the use of polyesterpolyol and blocked polyisocyanate. The polyesterpolyol has a specific molecular weight (not more than 8000), a specific hydroxyl value (17 to 50 KOH mg/g) and a glass transition point (Tg) of not higher than 70° C. That is, in the ink for ink-jet printing of the invention containing the above resin components, the resin components quickly react with each other upon being heated at a low temperature for a short period of time to form a cured polyurethane film which excellently adheres not only to inorganic substances such as metals but also to plastics and, specifically, to polyolefins that poorly adhere to other materials. For instance, as also described in Example appearing later, the image is ink-jet-printed by using the ink onto the surface of a polyethylene formed article. The image is then heated at 70 to 130° C. by blowing the hot air for about 1 to about 30 seconds so as to be quickly cured; i.e., the image is firmly adhered to the surface of the formed article without blurring.

By using the ink for ink-jet printing of the invention as described above, it is allowed to form a vividly printed layer without blurring not only on the inorganic materials such as metals but also on the articles formed by using plastic materials and, specifically, polyolefins such as polyethylene and polypropylene, the printed layer excellently adhering onto the formed articles.

In particular, the ink for ink-jet printing of the invention quickly cures upon the heating at a low temperature for a short period of time, and is very adapted to being ink-jet-printed on the surfaces of plastic formed articles effectively avoiding thermal deformation in the plastic formed articles caused by curing upon heating.

Modes for Carrying Out the Invention

The ink for ink-jet printing of the invention is obtained by dissolving or dispersing polyesterpolyol and polyisocyante, as resin components, in a volatile organic solvent, and, usually, further contains various known additives, as required, in addition to the above resin components.

Described below are the components.

<Resin Components>

The polyesterpolyol and the polyisocyanate contained, as resin components, in the ink for ink-jet printing of the invention, undergo the reaction easily with each other upon being heated at a suitable temperature (e.g., 70 to 130° C.) to form polyurethane.

The polyesterpolyol which is one of the resin components is obtained by reacting a polyhydric carboxylic acid with a polyhydric alcohol, and contains much polyester chains which are OH groups at both terminals thereof.

The polyesterpolyol is obtained by the polycondensation of a dicarboxylic acid with a diol, the diol component being used in excess amounts of not less than an equivalent amount relative to the dicarboxylic acid.

As the dicarboxylic acid, there can be exemplified at least one of terephthalic acid, isophthalic acid, orthophthalic acid, p-β-oxyethoxybenzoic acid, naphthalene-2,6-dicarboxylic acid, diphenoxyethane-4,4'-dicarboxylic acid, 5-sodiumsulfoisophthalic acid, hexahydroterephthalic acid, adipic acid, sebacic acid, succinic acid or malonic acid. It is also allowable to use in combination a polybasic carboxylic acid such as pyromellitic acid, trimellitic acid, 3,4,3',4'-biphenyltetracarboxylic acid or an anhydride thereof.

As the diol, there can be used at least one kind of ethylene glycol, propylene glycol, 1,4-butanediol, diethylene glycol, 1,6-hexylene glycol, cyclohexanedimethanol, or ethylene oxide adduct of bisphenol A. It is also allowable to use in combination an alcohol having a valence of 3 or more, such as trimethylolmethane, trimethylolethane, trimethylolpropane or pentaerythritol.

In the invention, it is necessary that the polyesterpolyol has a molecular weight of not more than 8000, a hydroxyl value (KOH mg/g) of 17 to 50 and a glass transition point (Tg) of not higher than 70° C. Namely, with the molecular weight, hydroxyl value and glass transition point lying outside the above ranges, the polyesterpolyol poorly dissolves or disperses in the volatile organic solvent that will be described later, forming aggregated particles that may cause the ink-jet nozzles to be clogged. Therefore, the polyesterpolyol cannot be used for the ink for ink-jet printing.

The polyesterpolyol having a hydroxyl value in a range of 17 to 50 KOH mg/g cures at a specifically high rate, and can form a cured product that excellently adheres onto the formed articles of a plastic material or a metal upon being heated at a low temperature for a short period of time. That is, the polyesterpolyol having hydroxyl groups in a suitable amount quickly undergoes the curing with the polyisocyanate described below at a low temperature, and its gel percentage (component insoluble in the solvent) reaches 80% or higher when it is cured at, for example, 80° C. Namely, a densely cured product is obtained contributing to improving not only close adhesion to the formed articles to which the layer is ink-jet-printed but also heat resistance and resistance against the chemicals.

For example, the polyesterpolyol having a hydroxyl value larger than the above-mentioned range has too many reaction points with the polyisocyanate and, therefore, cures at a decreased rate. To increase the rate of curing, therefore, the heating must be conducted at a temperature of, for example, in excess of 130° C. If the hydroxyl value is smaller than the above-mentioned range, on the other hand, the polyesterpolyol has too few reaction points with the polyisocyanate. As a result, the cured product that is obtained lacks density and exhibits deteriorated adhesiveness, deteriorated resistance against the hot water and deteriorated resistance against the chemicals.

The polyisocyanate used in combination with the above polyesterpolyol works as a so-called crosslinking agent. As the polyisocyanate though not limited thereto only, there can be, usually, exemplified diphenylmethane diisocyanate (MDI), tolylene diisocyanate (TDI), hexamethylene diisocyanate (HDI), metaxylene diisocyanate, tetramethylene diisocyanate, pentamethylene diisocyanate, lizine isocyanate, isophorone diisocyanate (IPDI) and polynuclear condensation product of these isocyanates. These compounds can be used in a single kind or in a combination of two or more kinds.

In the invention, among the above polyisocyanate, it is desired to use polyfunctional polyisocyanate having not less than 3 reactive isocyanate groups and, more desirably, to use polyisocyanate having not less than 5 reactive isocyanate groups and a polynuclear condensation product of HDI or IPDI (hereinafter often called polyfunctional polyisocyanate). That is, the polyfunctional polyisocyanate contains many isocyanate groups (NCO) that can serve as reaction points with the above-mentioned polyesterpolyol, helps increase the rate of curing, and is very effective in realizing the curing that takes place at a low temperature in a short period of time.

From the standpoint of storage stability, further, the polyisocyanate has its terminals blocked with a blocking agent. Representative examples of the blocking agent include alcohols such as methanol, ethanol, lactic acid ester, etc.; phenolic hydroxyl group-containing compounds such as phenol, salicylic acid ester, etc.; amides such as ε-caprolactum, 2-pyrrolidone, etc.; oximes such as acetone oxime, methyl ethyl ketone oxime, etc.; and active methylene compounds such as methyl acetoacetate, ethyl acetoacetate, acetylacetone, dimethyl malonate and diethyl malonate. These blocking agents may be used in one kind or in a combination of two or more kinds.

In the invention, among the above blocking agents, it is desired to use an active methylene compound particularly from the standpoint of low temperature and short period of time. That is, the polyisocyanate having its terminals blocked with the active methylene compound has a curing temperature of not higher than 100° C. (specifically, about 90° C.), and advantageously works for effecting the curing at a low temperature (e.g., at not higher than 130° C.). What effectively work as catalysts for the curing reaction are organotin, bismuth and zinc salt.

The curing temperature is a temperature at which the blocking agent blocking the terminals undergoes the reaction to bring forward the curing reaction.

The amount of the above polyisocyanate that is used varies depending on the number of its functional groups and cannot be strictly defined, but is, usually, used in such an amount that the functional group index represented by the following formula (1):

$$Y = NCO \text{ mol number}/PEO/OH \text{ mol number}/PIN \quad (1)$$
$$= (PIN/PEO) \cdot (NCO \text{ mol number}/OH \text{ mol number})$$

wherein PEO is a number average molecular weight of the polyesterpolyol, and PIN is a number average molecular weight of the polyisocyanate, is 0.4 to 2.0.

The functional group index Y represents a ratio of the (NCO mol number per a unit molecular weight of the polyol) and the (OH mol number per a unit molecular weight of the polyisocyanate). The value Y that is close to 1 means that OH and NCO are present in a state nearly equal to each other in the whole reaction system, and the urethane reaction proceeds quickly. Therefore, the closer the value Y to 1, the shorter the time required for the curing reaction which is more advantageous from the standpoint of close adhesion to the formed articles, too. As the value Y separates away from the above range, it means that much of OH and NCO are present in a scattered manner being separated away from each other. Therefore, more time is required for the curing reaction or there are many functional groups that cannot contribute to the reaction inviting disadvantage in regard to quick curing and close adhesion to the formed articles.

If the amount of the polyesterpolyol is denoted by A and the amount of the isocyanate by B, the above functional group index Y can be calculated from a value NCO/OH (mol ratio) derived from the following formula, $$NCO/OH(\text{mol ratio}) = (B/A) \times (561/OHV) \times (NCO\%/42)$$

wherein OHV is a hydroxyl value (mg KOH/g) of the polyesterpolyol (after dissolved in a solvent), and NCO % is the amount of the isocyanate groups (wt %) of the polyisocyanate (after dissolved in the solvent).

It is desired that the value Y calculated from the above NCO/OH (mol ratio) is in a range of 0.4 to 2.0. From the standpoint of properties of the cured film, however, it is desired that the polyesterpolyol and the polyisocyanate are so used that the value NCO/OH (mol ratio) lies in a range of 0.5 to 10.0 and, specifically, 0.8 to 6.0. Specifically, if the polyesterpolyol is used in a small amount and the value of NCO/OH (mol ratio) is larger than the above range, then the unreacted isocyanate remains much in the system. Further, if the polyesterpolyol is used in a large amount and the value of NCO/OH (mol ratio) is smaller than the above range, then the functional groups are present much on the polyol side that has not been crosslinked. In either case, the finally obtained cured film exhibits very deteriorated resistance against the chemicals, and will be rated to be defective in the judgement of curability demonstrated in Experiment 1 appearing later.

<Volatile Organic Solvents>

The ink for ink-jet printing of the invention is obtained by dissolving or dispersing the above resin components in a volatile organic solvent. To realize the curing at a low temperature in a short period of time, the organic solvent that is used must be volatile, as a matter of course.

In the present invention, the volatile organic solvent contains a medium-boiling organic solvent having a boiling point of not lower than 100° C. under the atmospheric pressure from such a standpoint that it excellently dissolves the polyesterpolyol and the polyisocyanate, it does not clog the nozzle heads, it corrodes little the head member so will not to impair the ejection, avoiding the use of a highly volatile solvent so will not to degenerate the solid component of ink, and enabling the ink-jet printing to be smoothly carried out.

Described below are concrete examples of the organic solvent though not limited thereto only.

Alcohol Organic Solvents;

Isopropanol, n-butyl alcohol, cyclohexanol, ethylene glycol, diethylene glycol.

Dialkyl Glycol Ether Solvents;

Diethylene glycol dimethyl ether, diethylene glycol methyl ethyl ether, diethylene glycol diethyl ether, diethylene glycol dibutyl ether, dipropylene glycol dimethyl ether.

Ethylene Glycol Ether Solvents;

Ethylene glycol monomethyl ether, diethylene glycol monomethyl ether, triethylene glycol monomethyl ether, ethylene glycol monobutyl ether, diethylene glycol monobutyl ether, triethylene glycol monobutyl ether, ethylene glycol monoisobutyl ether, diethylene glycol monoisobutyl ether, triethylene glycol monoisobutyl ether glycol, ethylene glycol acetate.

Propylene Glycol Ether Solvents;

Propylene glycol monomethyl ether, propylene glycol monopropyl ether, dipropylene glycol monopropyl ether, propylene glycol monobutyl ether, propylene glycol monomethyl ether acetate.

Ester Solvents;

Ethyl acetate, methyl acetate, isopropyl acetate, methyl propionate, ethyl propionate.

Ketone Solvents;

Pentane, acetone, cyclohexanone, methyl ethyl ketone (MEK), methyl isobutyl ketone (MIBK).

Ether Solvents;

Diethyl ether, dipropyl ether, diisopropyl ether, tetrahydrofurane.

Hydrocarbon Solvents;

Hexane, heptane, benzene.

The above organic solvents can be used either in a single kind or in the form of a mixed solvent by mixing two or more kinds of them.

In the invention, the diethylene glycol diethyl ether (DEDG) is most desired.

The ink for ink-jet printing obtained by dissolving or dispersing the above resin components in the volatile organic solvent is, usually, so adjusted as to have a viscosity at 25° C. in a range of 5 to 20 mPa·s and, specifically, 7 to 12 mPa·s by taking into consideration the ejection thereof through the nozzle head. The organic solvent is used in such an amount that the above viscosity will be obtained.

<Pigments>

The ink for ink-jet printing of the invention is suitably blended with pigments of various colors, as a matter of course, to print a layer for decoration or displaying information.

Described below are examples of the pigments.

Black Pigments;

Carbon black, acetylene black, lamp black, aniline black.

Yellow Pigments;

Chrome yellow, zinc yellow, cadmium yellow, yellow red oxide, mineral fast yellow, nickel titanium yellow, naples yellow, naphthol yellow S, Hansa Yellow G, Hansa Yellow 10G, Benzidine Yellow G, Benzidine Yellow GR, Quinolone Yellow Lake, Permanent Yellow NCG, Tartrazine Lake, azo yellow, benzimideazo yellow, azobis yellow.

Orange Pigments;

Chrome orange, molybdenum orange, permanent orange GTR, pyrazolone orange, Vulcan Orange, Indanthrene Brilliant Orange RK, Benzidine Orange G, Indanthrene Brilliant Orange GK, quinacrydone burn orange.

Red Pigments;

Red iron oxide, cadmium red, red lead, cadmium mercury sulfide, permanent red 4R, Lithol Red, pyrazolone red, watching red calcium salt, Lake Red D, Brilliant Carmine 6B, Eosine Lake, Rhodamine Lake B, Alizaline Lake, Brilliant Carmine 3B.

Violet Pigments;

Manganese violet, Fast Violet B, Methyl Violet Lake.

Blue Pigments;

Prussian blue, cobalt blue, Alkali Blue Lake, Victoria Blue Lake, phthalocyanine blue, metal-free phthalocyanine blue, partly chlorinated product of phthalocyanine blue, Fast Sky Blue, Indanthrene Blue BC, pigment violet, quinacridone red, quinacridone crimson, quinacridone magenta.

Green Pigments;

Chrome green, chromium oxide, Pigment Green B, Malachite Green Lake, Final Yellow Green G.

White Pigments;

Zinc flower, titanium oxide, antimony white, zinc sulfide.

Body Pigments;

Baryte powder, barium carbonate, clay, silica, white carbon, talc, alumina white.

Depending on the desired color, the above pigment can be blended in an amount of 1 to 20 parts by mass and, specifically, 3 to 15 parts by mass per 100 parts by mass of the above-mentioned resin components (sum of the polyesterpolyol and the polyisocyanate).

The ink for ink-jet printing of the invention is capable of forming a cured product (polyurethane) that excellently adheres to various formed articles upon being heated at a low temperature for a short period of time, and can be used for forming images and designs as well as for forming a layer for receiving the ink for ink-jet printing. Namely, depending upon the material of the formed articles (e.g., formed articles of a polyolefin as represented by propylene) on which the ink-jet printing is to be effected, it may happen to be difficult to hold an ordinary ink for ink-jet printing. In such a case, a receiving layer that serves as an underlying layer can be formed by the ink-jet printing by using the ink of the present invention (blended with no pigment, or blended with the body pigment or the white color pigment) prior to ink-jet-printing the images.

<Other Blending Agents>

The ink for ink-jet printing of the invention can be blended with various blending agents that have been known per se., such as surfactant, polymerization inhibitor, ultraviolet ray absorber, thickener, antioxidant, filler and the like in suitable amounts in ranges in which they do not impair the ink from curing upon being heated at a low temperature for a short period of time.

<Ink-Jet Printing>

In the invention, various layers can be printed or formed on the surfaces of various kinds of formed articles by ink-jet-printing the ink thereon. The thus ink-jet-printed layers may be solidly printed layers of various colors, or may be such images as characters.

The ink-jet printing is effected by ejecting the inks of various colors through the ink-jet nozzles responsive to the printing data. Responsive to the printing data, the ink-jet-printed layers (uncured layers) are so formed that the inks of various colors are overlapped one upon the other to form a full-color image.

After the ink-jet-printed layers (uncured layers) are formed as described above, the surfaces of the formed articles are heated to cure the ink layers so as to be fixed to the surfaces of the formed articles. The ink-jet printing is thus completed.

In the ink-jet printing, the ink layers are cured to a sufficient degree if the surfaces of the formed article are heated at 70 to 130° C. for a period of time that may vary depending on the temperature but is, usually, about 1 to about 30 seconds. There is no specific limitation on the heating means. For instance, the heating may be effected by blowing the hot air of such a temperature or by introducing the formed articles into a heated oven. Namely, suitable heating means can be employed depending on the form of the formed articles.

In the invention, the ink-jet printing is effected, usually, by using the ink of the invention and, specifically, the ink that contains a pigment of a predetermined color. By carrying out the ink-jet printing by using the ink containing no pigment (or containing a pigment of white color or pale color), it is allowed to form a layer for receiving the ink for ink-jet printing.

As described earlier, the ink for ink-jet printing of the invention is capable of forming a printed layer that highly closely adheres to the surfaces of the formed articles upon being heated at a low temperature for a short period of time, and, therefore, can be used even for forming the receiving layer for holding the ink for ink-jet printing. After the receiving layer has been formed, the ink-jet printing is carried out, usually, by using the ink for ink-jet printing of the invention described above.

Here, if the formed articles do not specifically require the condition of heating at a low temperature for a short period of time, the ink-jet printing can be conducted by using a known ink for ink-jet printing. After the ink has been applied for forming the receiving layer, the ink-jet printing can then be carried out followed, finally, by heating to cure it.

There is no particular limitation on the formed articles for which the above ink-jet printing is to be effected, and the formed articles may be those made from not only various plastic materials but also metals, ceramics and glasses. To maximize the advantage of the invention of effecting the curing by heating at a low temperature for a short period of time, however, it is desired that the formed articles are those made from plastic materials and, specifically, those made from a polyolefin to which inks poorly adhere and, particularly, those made from a polypropylene. Further, the ink is free from such a problem as producing offensive odor, and can be favorably used in the field of packages, such as printing the containers like cans, bottles and caps. The ink can be very favorably used for printing the outer surfaces of top panels of caps made from a polyolefin as represented by polypropylene.

EXAMPLE

The invention will now be described by way Experiment described below.
<Preliminary Testing>
Polyesterpolyols A to P shown in Table 1 were evaluated for their solubilities in an organic solvent to obtain the results as also shown in Table 1.
Evaluating the Solubilities;
The sample polyesterpolyols were each added in an amount of 25 parts by weight per 100 parts by weight of the diethylene diglycol (DEDG), and were heated in a hot bath maintained at 45° C. for 16 hours.
After heated, the solutions were filtered to make sure the presence of aggregated matters with the naked eye, and the solubilities were judged on the following basis.
 X: Aggregated matters were confirmed indicating poor solubility.
 ○: No aggregated matter was confirmed indicating good solubility.

TABLE 1

| Polyester-polyol | Molecular weight (Mn) × 10³ | Tg °C. | Hydroxyl value KOH mg/g | Solubility |
| --- | --- | --- | --- | --- |
| A | 23 | 47 | 5 | X |
| B | 17 | 67 | 6 | X |
| C | 19 | 60 | 6 | X |
| D | 22 | 72 | 5 | X |
| E | 23 | 7 | 5 | X |
| F | 16 | 47 | 7 | X |
| G | 15 | 68 | 3 | X |
| H | 8 | 79 | 16 | X |
| I | 10 | 60 | 11 | X |
| J | 18 | 79 | 5 | X |
| K | 14 | 71 | 7 | X |
| L | 18 | 84 | 5 | X |
| M | 8 | 65 | 20 | ○ |
| N | 6 | 46 | 19 | ○ |
| O | 5 | 53 | 50 | ○ |
| P | 3 | 60 | 37 | ○ |

From the above preliminary testing, it was learned that M to P dissolved well. Therefore, these polyesterpolyols were used in the following Experiment.

Experiment 1

After a high molecular activating agent was added to the diethylene glycol diethyl ether, carbon black was added thereto such that the amount thereof was 15 wt %. The mixture was dispersion-treated by using a stirrer and a bead mill. Thereafter, coarse particles were removed by centrifugation, and a dispersion solution was prepared.
Further, a mixed solution was prepared by mixing together the polyesterpolyol M and the polyisocyanate at an NCO/OH mol ratio of 5.36.
The polyesterpolyol was the one dissolved in the diethylene glycol diethyl ether. The polyisocyanate was the one blocked with the active methylene compound so as to have an average functional group number of 5.5 and an average molecular weight of 1500 which was being dissolved in a mixed solution of n-butyl acetate and n-butyl.

The above dispersion solution, mixed solution and diethylene glycol diethyl ether were so mixed together that the concentration of the pigment was 9 wt %, the amount of the solid components (sum of the polyesterpolyol and polyisocyanate) was 14 wt % and the viscosity was 7 to 9 mPa·s to prepare an ink for evaluation.

By using a piezo system on-demand ink-jet head, the ink for evaluation was ejected onto the top panel of a polyethylene cap for a PET bottle, and was so heated, by using a drier, that the temperature of the top panel of the cap was about 70 to about 130° C. for 1 to 5 seconds so as to be dried and cured.

The thus prepared sample was judged for its curing property. The curing property was evaluated as described below.
Evaluating the Curing Property;
The printed surface of a printed cap was brought into contact with a cardboard of a thickness of 4 mm manufactured by Oji Container Co. being pressed with a load weighing 1 kg. In this state, the printed cap was caused to slide thereon at a constant speed over a distance of 60 mm at a rate of 45 round trips a minute by using a slide testing machine manufactured by Toyo Seiki Mfg. Co. The testing was conducted up to 100 round trips and after that the printed surface was visually evaluated for peeling of the ink.
 ⊚: No peeling was recognized.
 ○: Peeling was recognized but the peeled area was not more than 5% of the printed area.
 X: Peeling was recognized and the peeled area was not less than 6% of the printed area.
 ⊚ and ○ represent allowable ranges and X represents a range which is not allowable.

Next, inks for evaluation were prepared in the same manner as described above but using the polyesterpolyols N, O and P, and were judged for their curing properties.
The curing properties were evaluated as follows depending on the polyesterpolyols:

| Polyesterpolyol | Curing property evaluated to be |
| --- | --- |
| M | ○ |
| N | ○ |
| O | ⊚ |
| P | ⊚ |

The invention claimed is:
1. An ink for ink-jet printing including a liquid obtained by dissolving or dispersing polyesterpolyol and blocked polyisocyanate in a volatile organic solvent, said polyesterpolyol having a number average molecular weight of not more than 8000, a hydroxyl value (KOH mg/g) in a range of 17 to 50 and a glass transition point (Tg) of not higher than 70° C.
2. The ink for ink-jet printing according to claim 1, wherein said polyisocyanate has not less than 3 functional groups.
3. The ink for ink-jet printing according to claim 1, wherein said blocked polyisocyanate includes at least one kind of a constituent unit selected from the group consisting of diphenylmethane diisocyanate (MDI), tolylene diisocyanate (TDI), hexamethylene diisocyanate (HDI), metaxylene diisocyanate, tetramethylene diisocyanate, pentamethylene diisocyanate, lizine isocyanate and isophorone diisocyanate (IPDI).

4. The ink for ink-jet printing according to claim 1, wherein said blocked polyisocyanate has its terminals blocked with an active methylene compound.

5. The ink for ink-jet printing according to claim 1, wherein diethylene glycol diethyl ether is used as said volatile solvent.

6. The ink for ink-jet printing according to claim 1, wherein a pigment is, further, contained.

7. A method of ink-jet-printing images on a surface of plastic or nonmetallic formed article, comprising:
   using the ink for ink-jet printing described in claim 1;
   forming a printed layer on the surface of the formed article by ink-jet-printing said ink thereon; and
   heating the surface of the formed article at a temperature of 70 to 130° C. to solidify said printed layer, wherein:
   (a) the formed article is a polyolefin cap, and ink-jet printing is performed on the outer surface of the top panel of the cap, and
   (b) said heating at a temperature of 70 to 130° C. for fixing the printed layer is carried out for 1 to 30 seconds.

* * * * *